United States Patent [19]

Tanaka

[11] Patent Number: 4,936,692

[45] Date of Patent: Jun. 26, 1990

[54] RECTILINEAR MOTION ROLLING GUIDE UNIT

[75] Inventor: Kazuhiko Tanaka, Tokyo, Japan

[73] Assignee: Nippon Thompson Co., Ltd., Tokyo, Japan

[21] Appl. No.: 405,214

[22] Filed: Sep. 11, 1989

[30] Foreign Application Priority Data

Feb. 20, 1989 [JP] Japan ............................... 1-17935[U]

[51] Int. Cl.[5] .............................................. F16C 29/06

[52] U.S. Cl. ...................................................... 384/43

[58] Field of Search ........................... 384/43, 44, 45, ; 464/168

[56] References Cited

U.S. PATENT DOCUMENTS 4,629,337 12/1986 Teramachi ............................ 384/43

4,799,803 1/1989 Tanaka .................................. 384/43

*Primary Examiner*—Thomas R. Hannon

*Attorney, Agent, or Firm*—Rogers & Killeen

[57] ABSTRACT

A rolling guide unit may include a cylindrical shaft with track grooves in the axial direction, a hollow outer cylinder with a hole for the shaft and track grooves facing the track grooves of the shaft, balls in the track grooves, and side plates attached to the ends of the outer cylinder with ball direction turning passageways to couple the outer cylinder track grooves and the ball return passageways. The side plates may include a thin inside plate and a thick outside plate, each of which has a cross sectional surface corresponding to a cross sectional surface of the outer cylinder. A mountain-shaped bridge portion having an arc-shaped cross sectional groove and defining an inwardly curved track is provided on the surface of the inside plate between the openings for the direction turning passageway and the return passageway. On the outside plate, a direction turning passageway U-turn portion is formed like an arc-shaped notched groove to correspond with the openings of the inside plate.

4 Claims, 5 Drawing Sheets

RECTILINEAR MOTION ROLLING GUIDE UNIT

BACKGROUND OF THE INVENTION

1. Field of the Invention

The present invention relates to a structure of a rectilinear motion rolling guide unit such as ball bushing, ball spline linear motion rolling guide unit or the like comprising a long cylindrical shaft member, a hollow cylindrical outer cylinder member having a hollow hole to slidably insert the cylindrical shaft member therein, and a number of balls which are inserted between both of those members and are endlessly circulated.

2. Description of the Related Background Art

As such a kind of rectilinear motion rolling guide unit, there has been known a ball spline linear motion rolling guide unit disclosed in Japanese Patent Application No. 231514-1987. The above guide unit comprises: a ball spline shaft on which a plurality of track grooves are formed in an axial direction at predetermined positions on the outer peripheral surface; an outer cylinder member which has a hollow cylindrical outer cylinder having a hollow hole into which the ball spline shaft is slidably inserted and in which track grooves which face the track grooves of the ball spline shaft are formed on the hollow inner peripheral surface and ball return holes communicating with those track grooves are formed in the outer cylinder member; and a number of balls which are inserted between the track grooves of the spline shaft and outer cylinder member. According to such a construction, side plates attached respectively to both end portions of the outer cylinder member, that is, a spacer ring 3' as an inside plate as shown in FIGS. 6 and 7 and an outside plate 4' are combined at surfaces respectively shown in the diagrams, thereby forming a ball direction turning passageway. An outer peripheral wall surface 4'a in the U-turn portion of the direction turning passageway is formed like a groove on the outside plate 4' (FIG. 7). On the other hand, the adjacent portions of the openings of the track side portion 4'a of a direction turning passageway 7' and of a return passageway side portion 4'b communicating with the track side portion 4'a are coupled with the confronting surface of the spacer ring 3' (FIG. 6) as the inside plate to be combined with the outside plate 4'. Thus, an inner peripheral wall 3'a of the turning passageway U-turn portion in the ball direction in the side plate is formed by a coupling surface 4'c as shown in FIG. 6.

FIG. 5*b* is a cross sectional view in the radial direction of the outer cylinder of the linear motion rolling guide unit in the prior art mentioned above. FIG. 5*a* is a diagram in the case where the direction turning passageway portion in FIG. 5*b* is seen from the top position. As clearly illustrated in FIG. 5*a*, in the conventional guide unit, a height different portion occurs in the outer peripheral wall surface portion 4'a of the direction turning passageway in the confronting surface boundary portion between the outside plate 4' and the spacer ring 3'.

In general, those side plates are formed by injection molding a synthetic resin material. In this case, since the inside die of the direction turning passageway portion of the spacer ring 3' is pulled out in the direction of the outside plate 4', it is impossible to form a trimming die such that it becomes narrow in the trimming direction in accordance with the outer peripheral wall surface 4'a of the direction turning passageway of the outside plate 4'. Therefore, it cannot help forming the outer peripheral wall surface which is almost parallel with the trimming direction.

Thus, there is a drawback such that a height different portion occurs in a part of the outer peripheral wall surface 4'a of the direction turning passageway as shown in FIG. 5*a* and the balls which are circulated in this portion do not smoothly move.

SUMMARY OF THE INVENTION

It is an object of the present invention to eliminate the drawbacks in the conventional techniques as mentioned above and to provide a cheap rectilinear motion rolling guide unit with a simple construction in which the balls can smoothly move in a direction turning passageway of a side plate and, therefore, a slide resistance is extremely small.

The present invention, therefore, relates to the improvement of the side plate member which is attached to the outer cylinder member in the prior art Japanese Patent Application No. 231514-1987.

The above object is accomplished by a rectilinear motion rolling guide unit comprising: a long cylindrical shaft member in which track grooves are formed in an axial direction at predetermined positions on its outer peripheral surface; a hollow cylindrical outer cylinder member which has a hollow hole adapted to slidably insert the shaft member and in which outer cylinder side track grooves which face the track grooves of the shaft member are formed on an inner peripheral surface of the hollow hole and ball return passageways communicating with the outer cylinder side track grooves are formed in the outer cylinder member; a number of balls which are inserted between both of the track grooves; and side plate members which are respectively attached to both end portions of the outer cylinder member and in which ball direction turning passageways for coupling the outer cylinder side track grooves and the ball return passageways communicating therewith are formed, wherein the side plate members are constructed by a surface confronting type combination of a thin inside plate and a thick outside plate each having a cross sectional surface corresponding to a cross sectional surface of the outer cylinder member, a mountain-shaped bridge portion having a groove of an arc-shaped cross section and defining an inwardly curved track is provided on a remote surface between openings on the outside surface of the inside plate of the track side portion of the direction turning passageway and a return passageway side portion communicating therewith which respectively pierce the inside plate and both of the openings are coupled, on the inside surface of the outside plate corresponding to the bridge portion, a direction turning passageway U-turn portion which couples the openings of the inside plate and forms an arc portion which is inwardly curved on the cross sectional surface in a radial direction of the outside plate is formed like a notched groove, the bridge portion of the inside plate is inserted into the notched groove-shaped U-turn portion and an inner peripheral wall surface and an outer peripheral wall surface of the U-turn portion are formed, and inner and outer peripheral wall surfaces of the ball direction turning passageway are formed as smooth surfaces by a surface confronting combination of the inside plate and the outside plate.

According to another aspect of the invention, a width of opening of the outer cylinder side track groove of the rectilinear motion rolling guide unit is set to be smaller than the ball diameter and the ball track grooves are respectively formed at the symmetrical positions on the cross sectional plane of the outer cylinder.

According to the invention, the following advantages are obtained.

(1) As compared with the conventional rectilinear motion rolling guide unit, the slide resistance of the rectilinear motion rolling guide unit of the invention is reduced.

(2) The inside plate can be easily worked.

(3) Since the inner peripheral wall surface is formed on the outside plate, the positional deviation with the outer peripheral wall surface corresponding to the inner peripheral wall surface as in the conventional rolling guide unit is eliminated.

(4) The rolling guide unit can be cheaply manufactured.

The above and other objects and features of the present invention will become apparent from the following detailed description and the appended claims with reference to the accompanying drawings.

BRIEF DESCRIPTION OF THE DRAWINGS

FIG. 1 is a perspective view with a part cut away of a rectilinear motion rolling guide unit in an embodiment according to the invention;

FIG. 2 is a partial enlarged front view of FIG. 1;

Figure 4B:
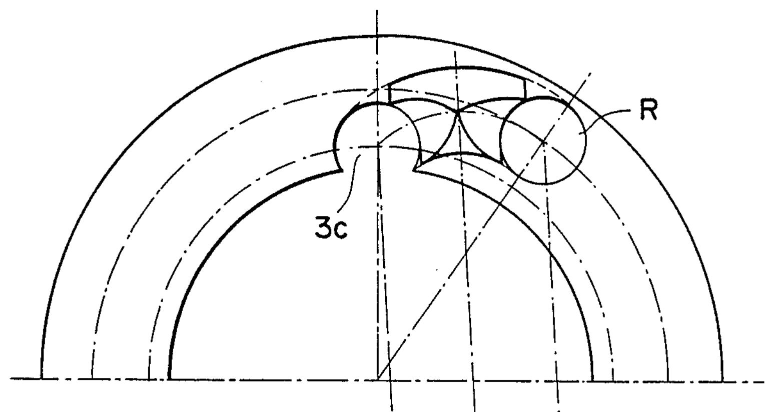
Figure 4A:
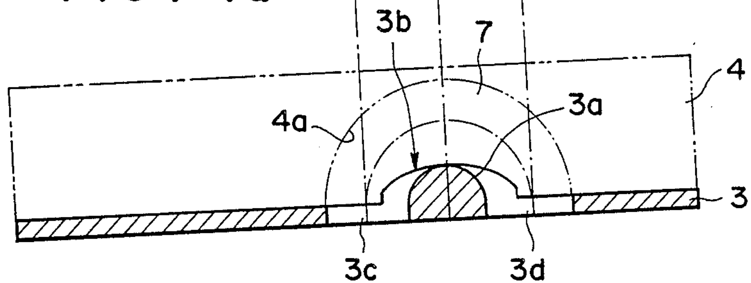

FIG. **3*a*** is a perspective view of an inside plate on a confronting surface side;

FIG. **3*b*** is a perspective view of an outside plate on a confronting surface side;

FIG. **4*a*** is a plan view of a side plate in which a state on a center line of a direction turning passageway is shown as a cross sectional view;

FIG. **4*b* is a side elevational view of FIG. 4*a*;**

Figure 5B:
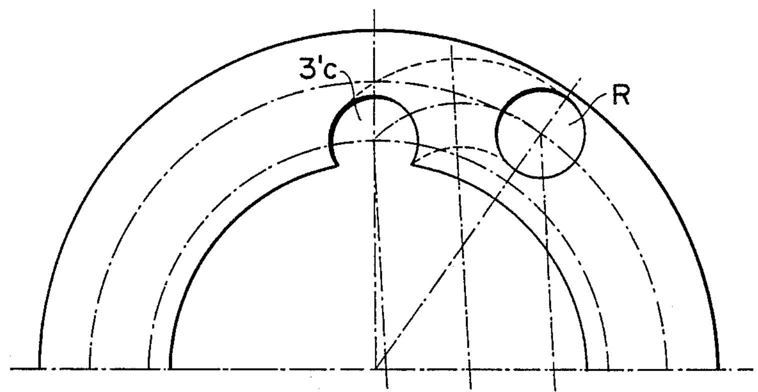
Figure 5A:
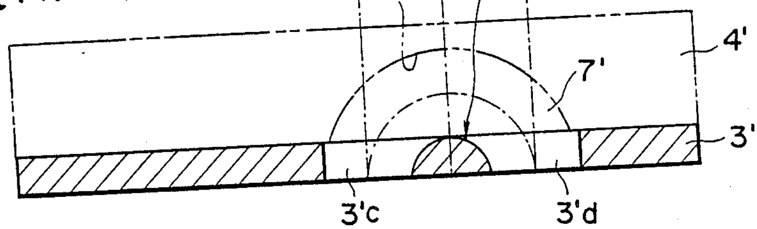

FIG. **5*a* to 7** show a conventional linear motion rolling guide unit to be improved by the present invention;

FIG. **5*a*** is a top view of a side plate of a spline linear motion rolling guide unit disclosed in Japanese Patent Application No. 231514-1987 as a prior art in which a state on a center line of a direction turning passageway is shown as a cross sectional view;

FIG. **5*b* is a side elevational view of FIG. 5*a*;**

Figure 6:
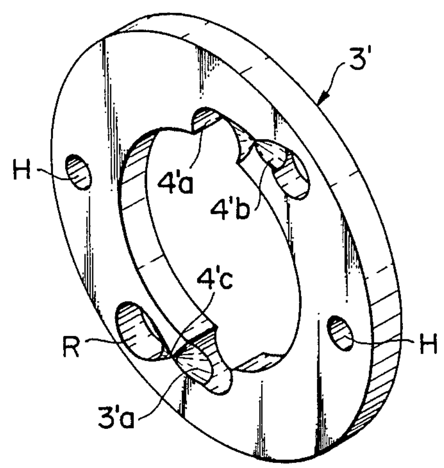
Figure 7:
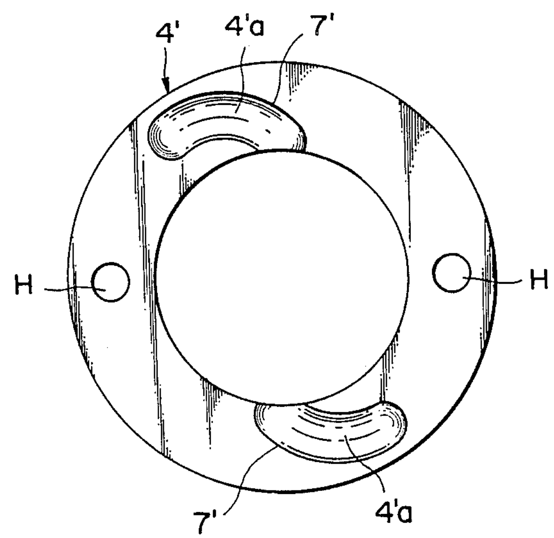

FIG. 6 is a perspective view of a spacer ring, that is, an inside plate which is attached to an edge portion of an outer cylinder of the above conventional linear motion rolling guide unit; and FIG. 7 shows an abutting surface of an outside plate to be combined with the inside plate shown in FIG. 6 in a surface abutting manner.

DETAILED DESCRIPTION OF THE PREFERRED EMBODIMENTS

Figure 1:
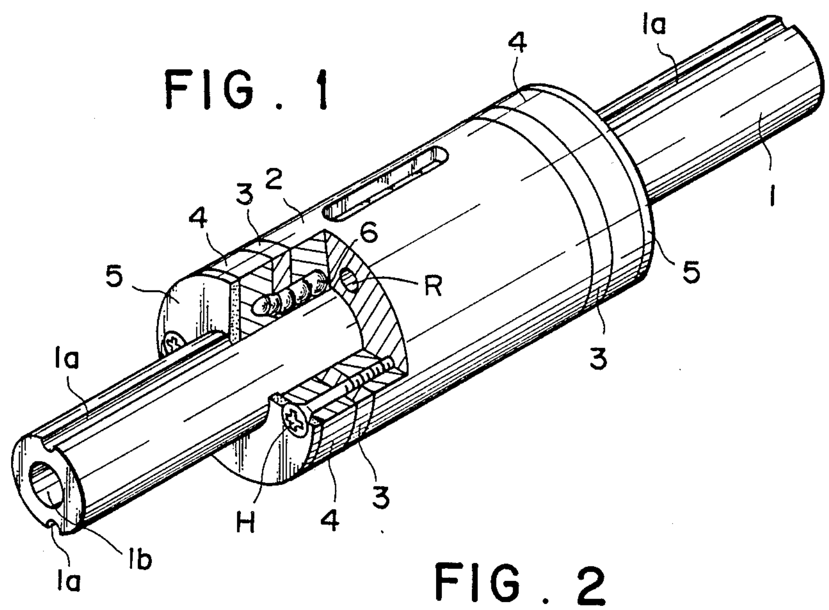
FIGS. 1 to 4 show an embodiment of the present invention.

FIG. 1 is a perspective view showing an embodiment of the present invention with a part of an outer cylinder member 2 cut away for easy understanding.

A linear motion rolling guide unit of FIG. 1 comprises: a long cylindrical shaft member 1 which has a through hole **1*b* and is formed with track grooves 1*a* in the longitudinal direction at the outer peripheral positions which are symmetrical with respect to an axial core; and the hollow cylindrical outer cylinder member 2 having a hollow hole into which the cylindrical shaft member 1 is slidably inserted. In the diagram, outer cylinder side track grooves 2*a* are formed on the inner peripheral surface of the hollow hole of the outer cylinder member 2 so as to face the track grooves 1*a* of the cylindrical shaft member 1. The outer cylinder member 2 is arranged on the shaft member 1 through a number of balls 6 which are inserted between the track grooves 1*a* and 2*a* of both members 1 and 2. In the outer cylinder member 2, a ball return passageway R communicating with the outer cylinder side track groove 2*a* (FIG. 2) is extended and formed in the outer cylinder member in parallel with the track groove 2*a*. Further, a ball direction turning passageway 7 to couple the outer cylinder side track groove 2*a* and the ball return passageway R communicating therewith is formed in a side plate member comprising the inside plate 3 having a thin thickness and the outside plate 4 having a thick thickness. Such a side plate member is attached to each of both end portions of the outer cylinder member 2. An endless circulating passageway for a number of balls 6 which roll between the track groove 1*a* of the cylindrical shaft member 1 and the corresponding outer cylinder side track groove 2*a* formed on the inner peripheral surface of the outer cylinder member 2 is formed in the outer cylinder member 2. A seal 5** is generally provided for the outer edge of each of the side plate members. However, the seals are not the essential component parts.

Figure 2:
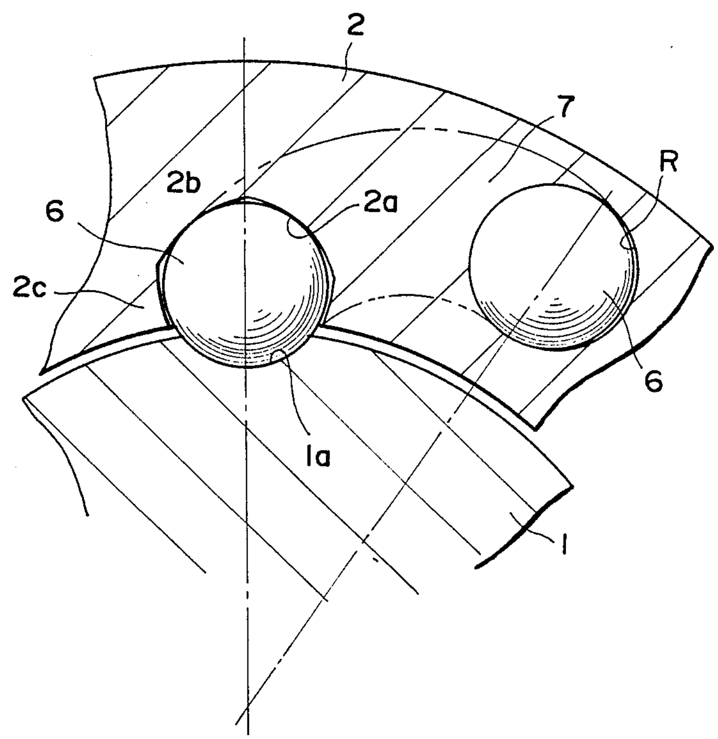

FIG. 2 is an enlarged cross sectional view in the radial direction of the portion of the outer cylinder member in FIG. 1 and shows the positional relations among the outer cylinder side track groove **2*a*, the relative return passageway R, and the relative cylinder shaft member side track groove 1*a*. Similarly to the foregoing conventional linear motion rolling guide unit disclosed in Japanese Patent Application No. 231514-1987, a track surface 2*b* is formed on the bottom portion of the outer cylinder side track groove 2*a*. A width of a track opening portion on the side which faces the track surface 2*b* is smaller than a diameter of the ball 6, thereby preventing that the rolling balls 6** drop out.

As clearly shown in FIG. 2, the return passageway R is extended in the outer cylinder member 2 in parallel with the outer cylinder side track groove **2*a* which extends in the axial direction in the outer cylinder member 2. The track groove 2*a* and the return passageway R are coupled at both end portions of the outer cylinder member by the ball direction turning passageways 7 which are formed by the side plate members attached to both end portions of the outer cylinder member 2, thereby forming an endless circulating passageway of the balls. A U-turn portion of the direction turning passageway 7 in the side plate member which is shown by a broken line and connects the track groove 2*a* and the return passageway R in FIG. 2** has an arc shape which is slowly inwardly curved when it is seen from the cross sectional view in the radial direction of the side plate member, thereby enabling the moving direction of the balls which roll in the U-turn portion to be smoothly turned.

FIGS. **3*a* and 3*b* are perspective views showing the thin inside plate 3 and the thick outside plate 4 which construct the side plate member which is attached to each of both ends of the outer cylinder member 2. The inside and outside plates 3 and 4 are integrally combined in a surface abutting manner as shown in a plan view of FIG. 4*a***, thereby constructing the side plate member.

Figure 3A:
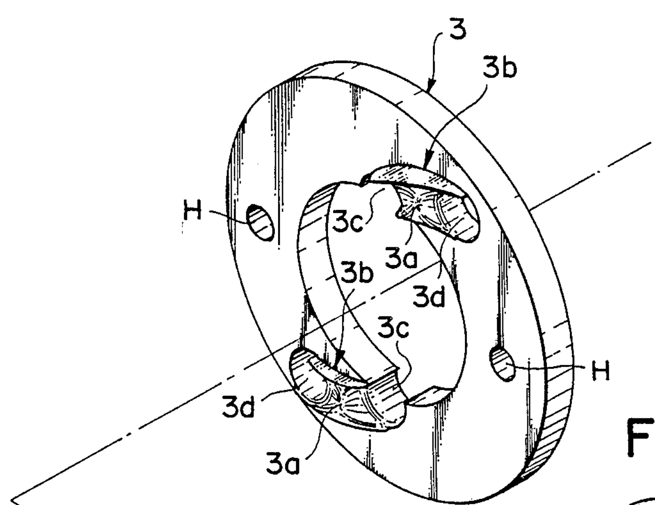

The side plate member as a feature of the invention is constructed in the following manner. Each of the inside and outside plates 3 and 4 preferably has the same shape as the cross sectional view in the radial direction of the outer cylinder member. In general, the side plate member is a hollow disk-shaped plate. As shown in FIGS. 4*a* and 4*b*, in the inside plate 3, openings 3*c* and 3*d* which form the track groove communicating portion of the direction turning passageway 7 which communicates with the outer cylinder side track groove 2*a* and the return passageway side portion which is concerned with the track groove communicating portion are formed in the track groove 2*a* and return passageway R so as to have the same center. A mountain-shaped bridge portion 3*b* is formed between the openings 3*c* and 3*d* which are away from each other on the outside surface which faces the outside plate 4. The cross sectional surface of the bridge portion 3*b* forms an upper arc-like groove and defines the track which is inwardly curved and extended like an arc on the outer surface of the inside plate 3 (FIGS. 2 and 3*a*). In both end portions of the groove track, the bridge portion 3*b* is smoothly coupled with the inner peripheral wall surfaces of the openings 3*c* and 3*d* of the inside plate. As a modification of the mountain-shaped bridge portion 3*b*, the cross sectional view thereof is set to a semicircular mountain-like shape and can be inwardly curved and extended like an arc on the outer surface of the inside plate.

Figure 3B:
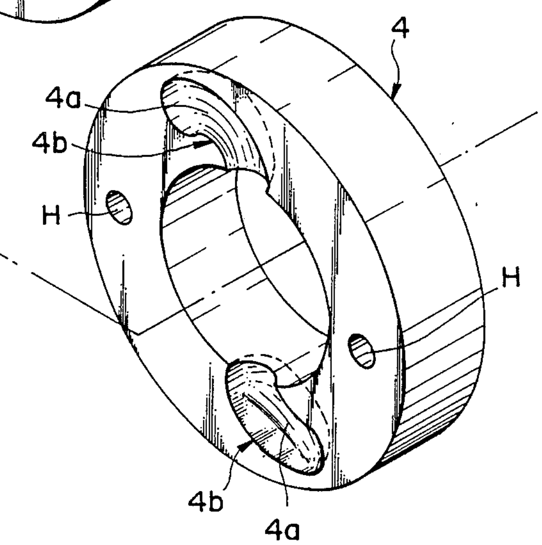

On the other hand, a notched groove 4*b* having both ends whose centers coincide with the centers of both openings 3*c* and 3*d* of the inside plate is formed on the surface of the outside plate 4 which confronts with the inside plate 3 as shown in a perspective view of FIG. 3*b*. On the cross sectional view in the radial direction of the outside plate, the notched groove 4*b* is curved inwardly at the same radius of curvature as that of the curved track of the bridge portion 3*b* and is extended. Therefore, when the surfaces of the inside plate 3 and outside plate 4 are confronted, the bridge portion 3*b* is inserted into the notched groove 4*b*. A U-turn passageway in which the arc-shaped groove is used as an inner peripheral wall surface and the notched groove inner wall which faces it is used as an outer peripheral wall surface and the moving direction of the balls can be smoothly turned is set in the side plate assembly. A degree of inwardly curved surface of the notched groove to form the U-turn portion of the direction turning passageway, that is, the radius of curvature of the notched groove can be changed in dependence on the thickness of the outer cylinder member 2 although the notched groove is shown as an arc-shaped curved portion in the outside plate 4 in the cross sectional view in the radial direction of the outside plate 4 as illustrated by a broken line in FIG. 2.

As mentioned above, by integrally combining the surface on the side shown in the diagram of the inside plate 3 in FIG. 3*a* and the surface on the side shown in the diagram of the outside plate 4 in FIG. 3*b* in a surface confronting manner, the track groove 2*a* formed on the outer cylinder member 2 and the return passage R are smoothly coupled by the direction turning passageway which is formed by the side plate members provided at both ends of the outer cylinder member 2. Thus, the endless circulating passageway of the ball linear motion rolling guide unit is formed in the outer cylinder member 2.

According to the ball direction turning passageway in the edge portion of the outer cylinder member provided by the side member in the conventional linear motion rolling guide unit shown in FIGS. 5*a* to 7, the outer cylinder track formed in the spacer ring 3′ corresponding to the inside plate and openings 3′c and 3′d formed in the relative return passageway are directly coupled at the outer surface of the spacer ring 3′ as shown in FIGS. 5*a* and 6. In such a coupling portion 4′c, an inner peripheral wall surface 4′b of the U-turn portion of the direction turning passageway is formed. As shown by reference numeral 4′a in FIG. 7, a notched groove forming the outer peripheral wall surface 4′a of the U-turn portion 7′ of the direction turning passageway is formed on the inner surface of the outside plate 4′. Therefore, as shown in FIG. 5*a*, the center of the semicircular track of the rolling ball of the direction turning passageway in the outside plate 4′ is located on the inside surface of the spacer ring 3′ and this track cannot be formed in a perfect semicircular shape due to the thickness of the spacer ring 3′. Thus, height different portions occur among the outer peripheral wall surfaces of the track groove communicating opening 3′c and return passageway communicating opening 3′d and the outer peripheral wall surfaces at both ends of the U-turn portion of the direction turning passageway 7′ provided in the outside plate 4′. A substantial slide resistance is caused when the balls 6 run on the direction turning passageway 7′ and the smooth run of the balls cannot be expected.

On the other hand, according to the present invention, by providing the mountain-shaped bridge portion 3*b* for the thin inside plate 3, as shown in a horizontal cross sectional view of FIG. 4*a*, the center of the semicircular track of the rolling balls of the direction turning passageway in the outside plate 4 can be shifted to the side of the outside plate irrespective of the thickness of the inside plate 3, so that the complete semicircular track can be formed in the thick outside plate 4. Consequently, the length of diameter of the perfect semicircular track and the distance between the outer peripheral walls of the track groove communicating opening 3*c* and return passageway communicating opening 3*d* which are formed in the inside plate 3 can be made coincide. The height different portion between the outer peripheral walls of the ball running passageway between both side plates 3 and 4 can be completely eliminated and the smooth running passageway can be provided.

Although the invention has been described with respect to the ball spline linear motion rolling guide unit in the embodiment, the invention can be also effectively applied to any kind of rectilinear motion rolling guide unit of the type in which the direction turning passageway in the side plate provided in each of both ends of the outer cylinder member is formed like an arc shape which is curved downwardly on a cross sectional surface in the radial direction of the side plate and the side plates are constructed by two inner and outer plate members.

The present invenion is not limited to the foregoing embodiment but many modifications and variations are possible within the spirit and scope of the appended claims of the invention.

What is claimed is:

1. A rectilinear motion rolling guide unit comprising:

a long cylindrical shaft member (1) in which track grooves (1*a*) are formed in the axial direction at predetermined positions on its outer peripheral surface;

a hollow cylindrical outer cylinder member (2) which has a hollow hole adapted to slidably insert said shaft member (1) and in which outer cylinder side track grooves (2*a*) which face said track grooves (1*a*) of the shaft member (1) are formed on an inner peripheral surface of said hollow hole and ball return passageways communicating with said outer cylinder side track grooves (*2a*) are formed in said outer cylinder member (2);

a number of balls (6) which are inserted between both of said track grooves (*1a* and *2a*); and side plate members (3 and 4) which are respectively attached to both end portions of the outer cylinder member (2) and in which ball direction turning passageways (7) for coupling the outer cylinder side track grooves (*2a*) and the ball return passageways communicating therewith are formed, wherein said side plate members (3 and 4) are constructed by a surface confronting type combination of a thin inside plate (3) and a thick outside plate (4) each having a cross sectional surface corresponding to a cross sectional surface of the outer cylinder member (2), a mountain-shaped bridge portion (*3b*) having a groove of an arc-shaped cross section and defining an inwardly curved track is provided on a remote surface between openings (*3c* and *3d*) on the outside surface of the inside plate of the track side portion of the direction turning passageway (7) and a return passageway side portion communicating therewith which respectively pierce the inside plate (3) and both of said openings (*3c* and *3d*) are coupled, on the inside surface of the outside plate (4) corresponding to said bridge portion (*3b*), a direction turning passageway U-turn portion which couples the openings (*3c* and *3d*) of the inside plate (3) and forms an arc portion which is inwardly curved on the cross sectional surface in a radial direction of the outside plate (4) is formed like a notched groove, the bridge portion (*3b*) of the inside plate (3) is inserted into said notched groove-shaped U-turn portion and an inner peripheral wall surface and an outer peripheral wall surface of the U-turn portion are formed, and inner and outer peripheral wall surfaces of the ball direction turning passageway (7) are formed as smooth surfaces by a surface confronting combination of the inside plate (3) and the outside plate (4).

2. A unit according to claim 1, wherein a width of opening of each of the outer cylinder side track grooves (*2a*) is smaller than a diameter of the balls (6) and their ball track grooves are respectively formed on the cross sectional surface of the outer cylinder member (2) at symmetrical positions.

3. The unit as defined in claim 1 wherein said groove of an arc-shaped cross section in the mountain-shaped bridge portion has a semicircular cross section with a diameter in the plane of the outside surface of the inside plate.

4. The unit as defined in claim 1 wherein said direction turning passageway U-turn portion in the outside plate has a semicircular cross section with a diameter in the plane of the inside surface of the outside plate.

* * * * *